(12) United States Patent
Schnabel

(10) Patent No.: US 6,688,361 B2
(45) Date of Patent: Feb. 10, 2004

(54) APPARATUS FOR CONNECTING POLYMERIC TAPE

(76) Inventor: Werner Schnabel, Dorfstrasse 26, D-74838 Limbach-Scheringen (DE)

(*) Notice: Subject to any disclaimer, the term of this patent is extended or adjusted under 35 U.S.C. 154(b) by 8 days.

(21) Appl. No.: 10/172,299

(22) Filed: Jun. 14, 2002

(65) Prior Publication Data

US 2003/0000650 A1 Jan. 2, 2003

(30) Foreign Application Priority Data

Jun. 27, 2001 (DE) .................................. 201 10 659 U

(51) Int. Cl.[7] .............................................. B30B 15/00
(52) U.S. Cl. .................. 156/359; 156/581; 156/583.1
(58) Field of Search .......................... 156/64, 359, 553, 156/580, 581, 583.1

(56) References Cited

U.S. PATENT DOCUMENTS

| | | | | |
|---|---|---|---|---|
| 4,743,333 A | * | 5/1988 | Forthmann | 156/359 |
| 4,761,197 A | * | 8/1988 | Christine et al. | 156/290 |
| 4,919,746 A | * | 4/1990 | Celia | 156/359 |

FOREIGN PATENT DOCUMENTS

DE            295 01 944.1         5/1995      ............ B65B/13/32

* cited by examiner

Primary Examiner—James Sells
(74) Attorney, Agent, or Firm—Karl Hormann

(57) ABSTRACT

An apparatus for heat connecting sections of polymeric tape, and provided with a thermostat-controlled welding head seated in a flat tubular member adapted to be inserted between sections of the tape and a control module for controlling the temperature of a heating coil as a function of supply voltage, the thermostat being positioned directly over the heating coil.

6 Claims, 2 Drawing Sheets

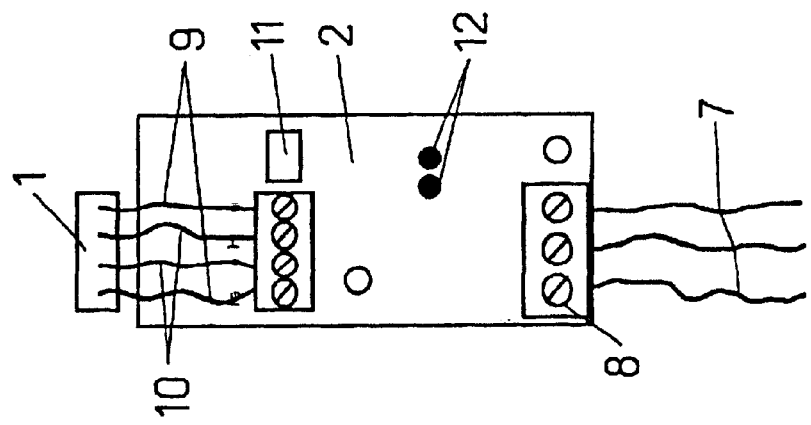
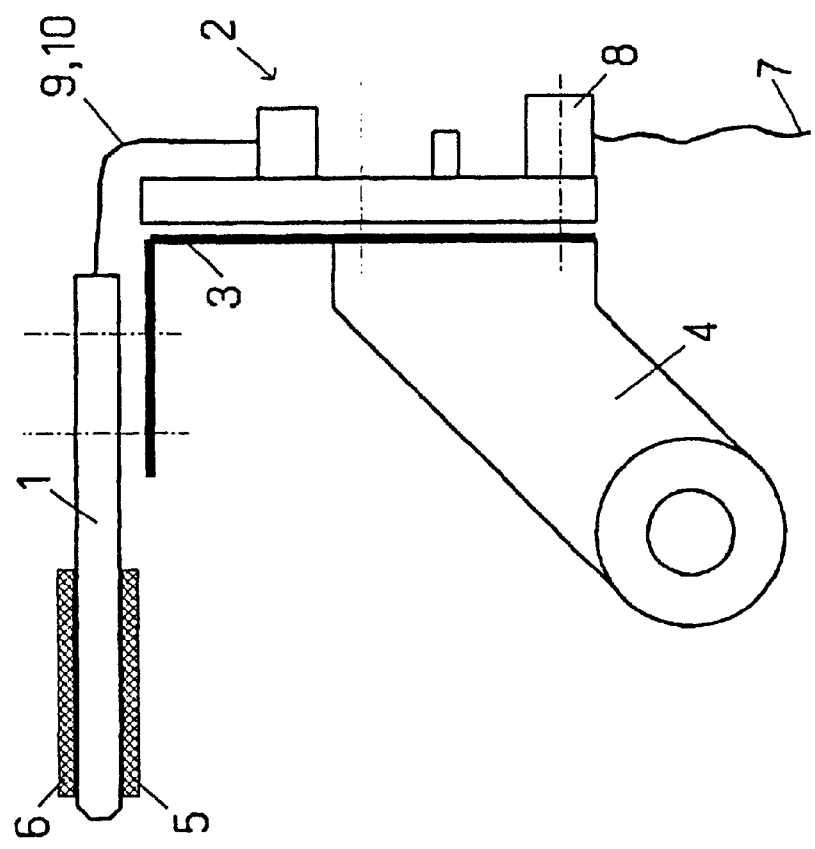

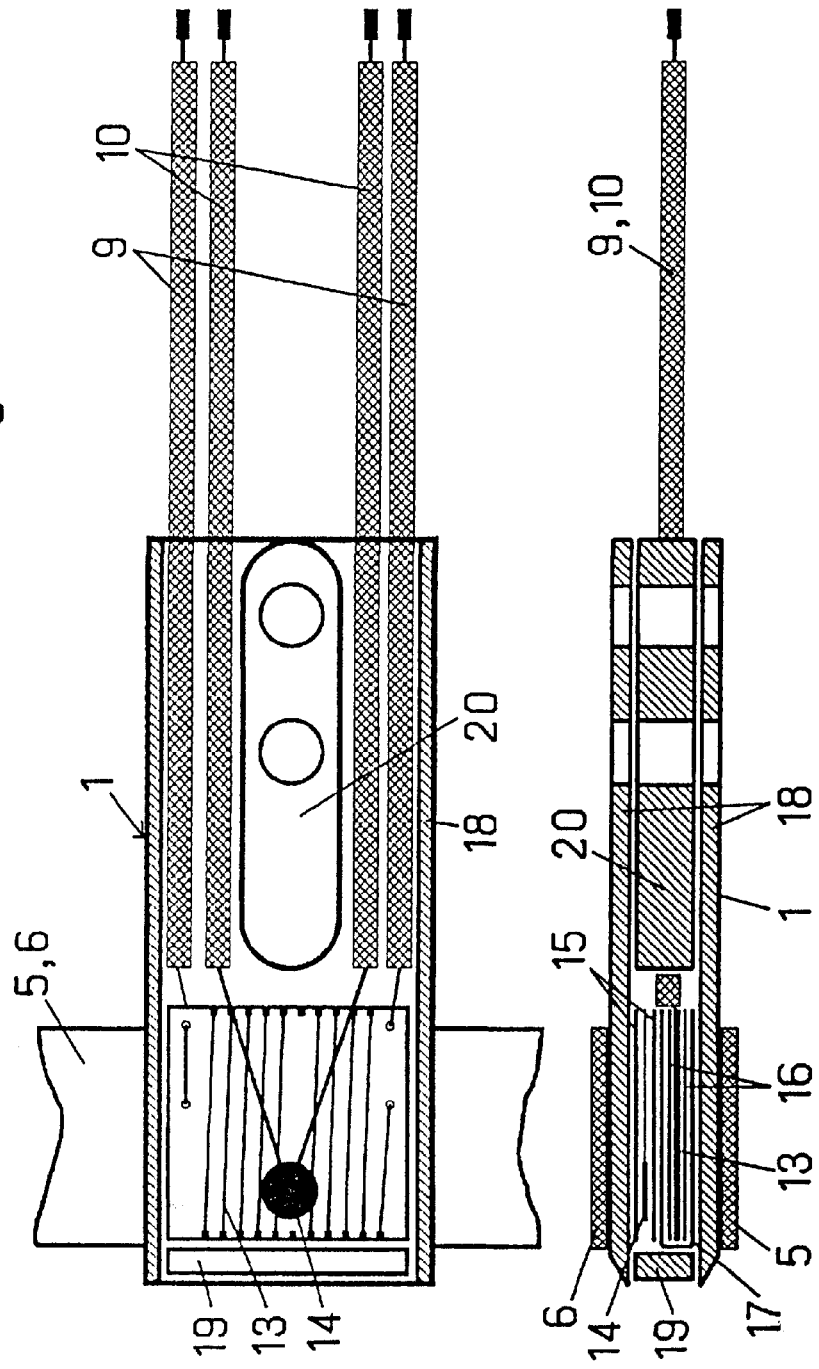

APPARATUS FOR CONNECTING POLYMERIC TAPE

BACKGROUND OF THE INVENTION

1. Field of the Invention

The invention, in general, relates to an apparatus for connecting polymeric tapes or the end portions thereof by heat welding and, more particularly, to an apparatus of the kind provided with a tongue-shaped or cantilevered temperature controlled welding head mounted on a pivotable arm.

2. The Prior Art

For purposes of reducing their weight as well as to prevent their rupture during transport, packing materials such as, for instance, crates, boxes and the like are often tied together or secured by polymeric ribbons or tapes. It is important that the tapes are tautly drawn and that their ends are securely connected. Furthermore, when packaging large quantities of items it is also important that the cycle times for tying or taping the boxes be as short as possible.

Commonly used polymeric packing tapes or ribbons may be securely connected by heat-welding or fusing and pressing. Relatively large heating device are required nowadays for heating the connecting spots. Such devices tend to be expensive as a result of their structural complexity as well as high power consumption. Heat dissipation in particular leads to power losses and heating of machine components. In addition, their heavy weight mitigates against convenient insertion of their welding head between the tapes at the connecting spot thereof.

OBJECTS OF THE INVENTION

It is, therefore, an object of the invention to provide a simplified and compact apparatus for forming localized connections between polymeric tapes.

Another object is to provide a compact apparatus for heat connecting polymeric tapes which is of low structural complexity and low power consumption.

Yet another object is to provide a tape welding apparatus of the kind which quickly reaches a stable operating temperature.

SUMMARY OF THE INVENTION

In the accomplishment of these and other objects the invention provides for a tape welding apparatus provided with a welding head and thermostat housed in a flat tube and associated with means disposed on the pivot arm ahead of the welding head for controlling the heat thereof.

A welding head structured in this fashion may be pivoted directly between tapes to be connected control module for heating the connection spot. To this end the heat of the welding head may be controlled such that it corresponds to given requirements even at short cycle times for taping up large numbers of boxes in the shortest possible time. Heat and energy losses are very low since heat is only generated where it is required for welding the tape.

By comparison with conventional equipment of this kind in which the temperature control is remote from the welding head and connected therewith by a highly flexible and expensive connecting cable, the apparatus in accordance with the invention is provided with a heat control module rigidly connected to the welding head. Possible defects in the transmission of very low user voltages in the millivolt range of the thermostat are thus effectively prevented.

In an advantageous embodiment the invention the control module is connected to a source of voltage and to the welding head and thermostat, and a potentiometer is provided for controlling the temperature of the welding head. The control module may be very compact and for the feed voltage it requires but a simple and cheap cable.

In accordance with a further embodiment, the control module controls the temperature as a function of the voltage. In this manner, voltage fluctuations cannot lead to temperature fluctuations of the welding head.

In yet another advantageous embodiment of the invention the thermostat for detecting the heating temperature is mounted between insulating materials on a heating coil. For temperature distribution the heating coil is housed in a heat conducting sleeve. Accordingly, the welding temperature may be measured directly at the welding site.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read with reference to the appended drawings, in which:

FIG. 1 is a schematic side view of the apparatus in accordance with the invention;

FIG. 2 is a top elevation of the control module;

FIG. 3 is a partial longitudinal sectional view of the welding head; and

FIG. 4 is a cross sectional view of the welding head.

DETAILED DESCRIPTION OF THE PREFERRED EMBODIMENTS

As seen in FIG. 1, a welding head 1 is structured in the manner of a tongue and is mounted on one arm of an angular bracket 3. The other arm of the bracket 3 is in turn affixed to a pivot arm 4 so that the tongue 1 may be pivoted between two ends 5, 6 of a polymeric tape to be welded together. The other arm of the bracket 3 also supports a control module 2.

FIG. 2 depicts a cable 7 by which the control module 2 is connected to a source of voltage (not shown). The cable 7 is connected to the control module 2 at a terminal 8. The welding head 1 is connected to the control module by conduits 9, 10. A potentiometer 11 is provided for controlling the heat of the welding head 1. Two light emitting diodes 12 are provided for monitoring the function of the apparatus.

FIG. 3 depicts the conduits 9 by which the control module 2 is connected to a heating coil 13 provided for heating the welding head 1. A thermostat 14 for detecting the heating temperature is connected to the control module 2 by conduits 10. The thermostat 14 is seen to be arranged between conventional insulating materials 15 directly over the heating coil 13 (FIG. 4). The heating coil 13 is seated between insulating material 16 within a heat conductive sleeve 17. The heating coil 13 and its layers of insulating material 16 and sleeve 17 as well as the thermostat 14 with its layers of insulating material 15 are preferably press-fitted into a flat tubular member 18. The forward end of the flat tubular member 18 is sealed by a closure 19. A filler 20 is provided for mounting the welding head 1 on the bracket 3.

The components depicted in FIGS. 1–4 have been drawn on an enlarged scale. The thickness of an actual flat tubular member 18 between the tape material 5, 6, as shown in FIG. 4, is about 0.08" (2 mm). Accordingly, any mass to be moved is very small and the heating-up time is no more than a few seconds. This leads to a reduced energy consumption as the welding head need only be energized for the short time required to weld the tapes together. The short heat-up time also ensures short cycle times.

What is claimed is:

1. An apparatus for heat connecting sections of polymeric tape, comprising:
   a thin elongated welding head for heating the tape sections and provided with a thermostat;
   a pivoting arm for supporting the welding head;
   a substantially flat tubular member for receiving the welding head and the thermostat; and
   a control module mounted ahead of the welding head on the pivoting arm for temperature control.

2. The apparatus of claim 1, further comprising:
   means for connecting the control module to a source of voltage;
   means for connecting the control module to the thermostat; and
   means for varying the voltage for controlling the temperature of the welding head.

3. The apparatus of claim 2, wherein the means for varying the voltage is a potentiometer.

4. The apparatus of claim 2, wherein the control module comprises means for controlling the temperature as a function of voltage.

5. The apparatus of claim 1, further comprising:
   a heating coil;
   a heat conductive sleeve for receiving the heating coil; and
   insulating material for receiving the thermostat at a position directly on the heating coil for detecting the heating temperature.

6. The apparatus of claim 1, wherein the pivoting arm comprises a two-armed bracket, one arm being affixed to the pivoting arm and supporting the control module, the other arm being cantilevered of the first arm and supporting the welding head.

* * * * *